United States Patent
Kruckenberg et al.

(10) Patent No.: US 7,832,983 B2
(45) Date of Patent: Nov. 16, 2010

(54) NACELLES AND NACELLE COMPONENTS CONTAINING NANOREINFORCED CARBON FIBER COMPOSITE MATERIAL

(75) Inventors: Teresa M. Kruckenberg, La Mesa, CA (US); Valerie A. Hill, Villa Rica, GA (US)

(73) Assignees: Goodrich Corporation, Charlotte, NC (US); Rohr, Inc., Chula Vista, CA (US)

( * ) Notice: Subject to any disclaimer, the term of this patent is extended or adjusted under 35 U.S.C. 154(b) by 54 days.

(21) Appl. No.: 12/299,235

(22) PCT Filed: May 1, 2007

(86) PCT No.: PCT/US2007/067934

§ 371 (c)(1),
(2), (4) Date: Feb. 18, 2009

(87) PCT Pub. No.: WO2007/130979

PCT Pub. Date: Nov. 15, 2007

(65) Prior Publication Data

US 2009/0176112 A1 Jul. 9, 2009

Related U.S. Application Data

(60) Provisional application No. 60/796,995, filed on May 2, 2006.

(51) Int. Cl.
*F03B 1/04* (2006.01)
(52) U.S. Cl. .......... 415/200; 60/771; 428/457; 428/293.4; 977/750
(58) Field of Classification Search .......... 428/292.1, 428/293.4, 457; 415/200; 977/750, 762; 239/265.33, 265.37; 60/771, 226.1; 244/1
See application file for complete search history.

(56) References Cited

U.S. PATENT DOCUMENTS

| | | | |
|---|---|---|---|
| 2,496,279 A | 2/1950 | Ely et al. | |
| 2,627,012 A | 1/1953 | Kinsella et al. | |
| 3,178,560 A | 4/1965 | Mapp et al. | |
| 3,266,005 A | 8/1966 | Balde et al. | |
| 3,349,359 A | 10/1967 | Morey et al. | |
| 3,367,851 A | 2/1968 | Filreis et al. | |
| 3,385,959 A | 5/1968 | Ames et al. | |
| 3,397,302 A | 8/1968 | Hosford | |
| 3,420,476 A | 1/1969 | Volkner et al. | |

(Continued)

FOREIGN PATENT DOCUMENTS

| | | |
|---|---|---|
| CA | 1129512 | 8/1982 |
| DE | 162009 | 1/1919 |
| DE | 1615123 | 5/1970 |
| DE | 2832119 | 2/1979 |
| EP | 0680878 | 11/1995 |

(Continued)

OTHER PUBLICATIONS

Extended European Search Report (Appln. No. 08019213.1; mailed Dec. 19, 2008).

(Continued)

*Primary Examiner*—N. Edwards
(74) *Attorney, Agent, or Firm*—Womble Carlyle Sandridge & Rice, PLLC

(57) ABSTRACT

This invention is directed to nacelles and nacelle components for use in aircraft engines. The nacelles and components comprise composite material containing carbon fiber. The carbon fiber comprises from 0.1 to 20 percent by weight nanoreinforcement material.

11 Claims, 4 Drawing Sheets

U.S. PATENT DOCUMENTS

| | | |
|---|---|---|
| 3,495,328 A | 2/1970 | Ziver |
| 3,657,516 A | 4/1972 | Fujihara |
| 3,800,121 A | 3/1974 | Dean et al. |
| 3,885,758 A | 5/1975 | Croswell, Jr. |
| 3,935,422 A | 1/1976 | Barnes et al. |
| 4,021,008 A | 5/1977 | Eichenauer |
| 4,036,457 A | 7/1977 | Volkner et al. |
| 4,062,917 A | 12/1977 | Hill et al. |
| 4,250,397 A | 2/1981 | Gray et al. |
| 4,291,079 A | 9/1981 | Hom |
| 4,429,216 A | 1/1984 | Brigham |
| 4,468,557 A | 8/1984 | Bylin et al. |
| 4,473,740 A | 9/1984 | Ellis |
| 4,514,619 A | 4/1985 | Kugelman |
| 4,518,851 A | 5/1985 | Oppitz |
| 4,522,889 A | 6/1985 | Ebneth |
| 4,534,886 A | 8/1985 | Kraus et al. |
| 4,737,618 A | 4/1988 | Barbier et al. |
| 4,743,740 A | 5/1988 | Adee |
| 4,824,713 A | 4/1989 | Brick |
| 4,826,108 A | 5/1989 | Briscoe et al. |
| 4,837,618 A | 6/1989 | Hatori et al. |
| 4,942,078 A | 7/1990 | Newman et al. |
| 4,972,197 A | 11/1990 | McCauley et al. |
| 4,983,814 A | 1/1991 | Ohgushi et al. |
| 5,023,433 A | 6/1991 | Gordon |
| 5,098,037 A | 3/1992 | Leffel et al. |
| 5,192,605 A | 3/1993 | Mercuri et al. |
| 5,248,116 A | 9/1993 | Rauckhorst |
| 5,260,124 A | 11/1993 | Gaier |
| 5,344,696 A | 9/1994 | Hastings et al. |
| 5,351,918 A | 10/1994 | Giamati et al. |
| 5,356,096 A | 10/1994 | Rauckhorst, III et al. |
| 5,361,183 A | 11/1994 | Wiese |
| 5,424,054 A | 6/1995 | Bethune et al. |
| 5,427,332 A | 6/1995 | Rauckhorst, III et al. |
| 5,445,327 A | 8/1995 | Creehan |
| 5,453,597 A | 9/1995 | McWilliams |
| 5,470,413 A | 11/1995 | Cedarleaf |
| 5,475,204 A | 12/1995 | Giamati et al. |
| 5,566,892 A | 10/1996 | Creehan |
| 5,584,450 A | 12/1996 | Pisarski |
| 5,653,836 A | 8/1997 | Mnich et al. |
| 5,657,951 A | 8/1997 | Giamati |
| 5,657,952 A | 8/1997 | Goldberg |
| 5,747,161 A | 5/1998 | Iijima |
| 5,765,779 A | 6/1998 | Hancock et al. |
| 5,824,996 A | 10/1998 | Kochman et al. |
| 5,846,356 A | 12/1998 | Vyakarnam et al. |
| 5,853,877 A | 12/1998 | Shibuta |
| 5,925,275 A | 7/1999 | Lawson et al. |
| 5,934,617 A | 8/1999 | Rutherford |
| 5,942,140 A | 8/1999 | Miller et al. |
| 5,947,418 A | 9/1999 | Bessiere et al. |
| 5,971,323 A | 10/1999 | Rauch et al. |
| 6,027,075 A | 2/2000 | Petrenko |
| 6,031,214 A | 2/2000 | Bost et al. |
| 6,054,690 A | 4/2000 | Petit et al. |
| 6,094,907 A | 8/2000 | Blackner |
| 6,137,083 A | 10/2000 | Bost et al. |
| 6,145,787 A | 11/2000 | Rolls |
| 6,194,685 B1 | 2/2001 | Rutherford |
| 6,227,492 B1 | 5/2001 | Schellhase et al. |
| 6,237,874 B1 | 5/2001 | Rutherford et al. |
| 6,265,466 B1 | 7/2001 | Glatkowski et al. |
| 6,279,856 B1 | 8/2001 | Rutherford et al. |
| 6,328,258 B1 | 12/2001 | Porte |
| 6,330,986 B1 | 12/2001 | Rutherford et al. |
| 6,338,455 B1 | 1/2002 | Rauch et al. |
| 6,371,242 B1 | 4/2002 | Wilson et al. |
| 6,403,935 B2 | 6/2002 | Kochman et al. |
| 6,427,946 B1 | 8/2002 | Petrenko |
| 6,483,087 B2 | 11/2002 | Gardiner et al. |
| 6,521,873 B1 | 2/2003 | Cheng et al. |
| 6,576,115 B2 | 6/2003 | Petrenko |
| 6,639,381 B2 | 10/2003 | Tamura et al. |
| 6,653,598 B2 | 11/2003 | Petrenko |
| 6,680,016 B2 | 1/2004 | Wang et al. |
| 6,682,677 B2 | 1/2004 | Lobovsky et al. |
| 6,706,402 B2 | 3/2004 | Rueckes et al. |
| 6,725,542 B1 | 4/2004 | Maguire |
| 7,273,661 B2 | 4/2004 | Moriyama et al. |
| 6,730,892 B2 | 5/2004 | Suda et al. |
| 6,762,237 B2 | 7/2004 | Glatkowski et al. |
| 6,770,848 B2 | 8/2004 | Haas et al. |
| 6,783,746 B1 | 8/2004 | Zhang et al. |
| 6,835,591 B2 | 12/2004 | Rueckes et al. |
| 6,848,656 B2 | 2/2005 | Linton |
| 6,870,139 B2 | 3/2005 | Petrenko |
| 6,917,021 B2 | 7/2005 | Kano et al. |
| 7,152,829 B2 | 8/2005 | Bertolotti et al. |
| 6,939,525 B2 | 9/2005 | Colbert et al. |
| 6,986,853 B2 | 1/2006 | Glatkowski et al. |
| 7,026,432 B2 | 4/2006 | Charati et al. |
| 7,029,603 B2 | 4/2006 | Wang et al. |
| 7,034,257 B2 | 4/2006 | Petrenko |
| 7,047,725 B2 | 5/2006 | Moe et al. |
| 7,049,353 B2 | 5/2006 | Conroy et al. |
| 7,060,241 B2 | 6/2006 | Glatkowski |
| 7,078,658 B2 | 7/2006 | Brunner et al. |
| 7,105,596 B2 | 9/2006 | Smalley et al. |
| 7,118,693 B2 | 10/2006 | Glatkowski et al. |
| 7,153,452 B2 | 12/2006 | Ogale et al. |
| 7,157,663 B1 | 1/2007 | Kismarton |
| 7,198,745 B2 | 4/2007 | Newman et al. |
| 7,211,772 B2 | 5/2007 | Carpino, II et al. |
| 7,220,484 B2 | 5/2007 | Ton-That et al. |
| 7,229,683 B2 | 6/2007 | Fischer et al. |
| 7,259,358 B2 | 8/2007 | Mariner et al. |
| 7,378,040 B2 | 5/2008 | Luo et al. |
| 7,408,186 B2 | 8/2008 | Merkulov et al. |
| 7,485,678 B2 | 2/2009 | Ohashi et al. |
| 7,588,212 B2 | 9/2009 | Moe et al. |
| 7,601,421 B2 | 10/2009 | Khabashesku et al. |
| 7,645,400 B2 | 1/2010 | Saitoh |
| 2002/0035170 A1 | 3/2002 | Glatkowski et al. |
| 2002/0096506 A1 | 7/2002 | Moreland et al. |
| 2003/0164427 A1 | 9/2003 | Glatkowski et al. |
| 2004/0065659 A1 | 4/2004 | Tse |
| 2004/0069772 A1 | 4/2004 | Kondo et al. |
| 2004/0265550 A1 | 12/2004 | Glatkowski et al. |
| 2005/0031843 A1* | 2/2005 | Robinson et al. .......... 428/293.4 |
| 2005/0069701 A1 | 3/2005 | Watanabe et al. |
| 2005/0127329 A1 | 6/2005 | Wang et al. |
| 2005/0191493 A1 | 9/2005 | Glatkowski et al. |
| 2005/0209392 A1 | 9/2005 | Luo et al. |
| 2005/0221016 A1 | 10/2005 | Glatkowski et al. |
| 2005/0230560 A1 | 10/2005 | Glatkowski et al. |
| 2006/0032983 A1 | 2/2006 | Brand et al. |
| 2006/0043240 A1 | 3/2006 | Hindel et al. |
| 2006/0057290 A1 | 3/2006 | Glatkowski et al. |
| 2006/0060825 A1 | 3/2006 | Glatkowski et al. |
| 2006/0078705 A1 | 4/2006 | Glatkowski et al. |
| 2006/0135677 A1 | 6/2006 | Huang et al. |
| 2006/0155043 A1 | 7/2006 | Johnson et al. |
| 2006/0217482 A1 | 9/2006 | Lukehart et al. |
| 2006/0249711 A1 | 11/2006 | Niu et al. |
| 2007/0131915 A1 | 6/2007 | Stankovich et al. |
| 2007/0298669 A1 | 12/2007 | Barrera et al. |
| 2008/0020193 A1 | 1/2008 | Jang et al. |
| 2008/0063875 A1* | 3/2008 | Robinson et al. ............ 428/426 |
| 2008/0166563 A1* | 7/2008 | Brittingham et al. ..... 428/411.1 |
| 2008/0176983 A1 | 7/2008 | Niu et al. |
| 2008/0248275 A1 | 10/2008 | Jang et al. |

| | | | |
|---|---|---|---|
| 2008/0257015 | A1 | 10/2008 | Lukehart et al. |
| 2009/0068461 | A1 | 3/2009 | Reneker et al. |
| 2009/0176112 | A1* | 7/2009 | Kruckenberg et al. ....... 428/457 |
| 2009/0227162 | A1* | 9/2009 | Kruckenberg et al. .......... 442/1 |

FOREIGN PATENT DOCUMENTS

| | | |
|---|---|---|
| EP | 1109218 | 6/2001 |
| EP | 1600469 | 11/2005 |
| EP | 1865150 A1 | 12/2007 |
| FR | 72.12275 | 11/1972 |
| GB | 1117843 | 6/1968 |
| GB | 1247071 | 9/1971 |
| GB | 1314162 | 4/1973 |
| GB | 2155062 | 9/1985 |
| GB | 2243412 | 10/1991 |
| GB | 2258095 | 1/1993 |
| GB | 2259287 | 3/1993 |
| JP | 60-072732 | 4/1985 |
| JP | 2-110196 | 4/1990 |
| JP | 5-140486 A | 6/1993 |
| JP | 6-36853 | 2/1994 |
| JP | 2002 080617 A | 3/2002 |
| JP | 2003 239171 | 8/2003 |
| JP | 2003239171 | 8/2003 |
| WO | WO 91/11891 | 8/1991 |
| WO | WO 96/28258 | 9/1996 |
| WO | WO 96/28258 A | 9/1996 |
| WO | WO 00/33614 | 6/2000 |
| WO | WO 02/76430 | 10/2002 |
| WO | WO 03/062056 | 7/2003 |
| WO | WO 03/069955 | 8/2003 |
| WO | WO 03/076703 | 9/2003 |
| WO | WO2003/076703 | 9/2003 |
| WO | WO 2004/001107 | 12/2003 |
| WO | WO 2005/020635 | 3/2005 |
| WO | WO 2005/028174 | 3/2005 |
| WO | WO 2005/044723 | 5/2005 |
| WO | WO 2005/055930 | 6/2005 |
| WO | WO 2006/008518 | 1/2006 |
| WO | WO 2007/130979 | 11/2007 |
| WO | WO2007/130979 | 11/2007 |
| WO | WO 2007/136613 | 11/2007 |
| WO | WO 2008/056123 | 5/2008 |

OTHER PUBLICATIONS

International Search Report and Written Opinion, Oct. 31, 2007, pp. 1-13, International Search Authority, European Patent Office.
International Preliminary Report on Patentability (Chapter I of the PCT); Nov. 13, 2008, pp. 1-8, The International Bureau of WIPO, Geneva, Switzerland.
EP 06005409.5-2315 - Search Report dated May 10, 2006, pp. 1-7, EPO.
EP 06005410.3. 2315 - Extended Search Report dated Jul. 6, 2006, pp. 1-13, European Patent Office.
EP 08019213.1 - Extended Search Report dated Dec. 19, 2008.
GB 0725083 - Combined Search and Examination Report dated Mar. 31, 2008, pp. 1-5, UK Intellectual Property Office.
GB 0725083.0 - Search Report dated Sep. 16, 2008, pp. 1-2, UK Intellectual Property Office.
PCT/US2007/063717 - Search Report dated Sep. 10, 2008, pp. 1-5, European Patent Office.
PCT/US2007/063717— International Preliminary Report on Patentability dated Dec. 31, 2008.
PCT/US2007/067934 - International Preliminary Report on Patentability dated Nov. 13, 2008.
PCT/US2007/067934 - International Search Report and Written Opinion ISA/EP dated Oct. 31, 2007.
Sarah Black, "Filament winding with large tow carbon fiber", High Performance Composites Sourcebook 2006, May 2005, pp. 1-4.
O. Breuer et al "Big Returns From Small Fibers: A Review of Polymer/Carbon Nanotube Composites" Polymer Composites, Dec. 2004, vol. 25, No. 6, pp. 630-645.
Ron Brewer "Evaluating Lightning Suscefdcdptibility" (EMC Test), Entrepreneur.com, Jul. 2008.
Daniel T. Colbert, Single-Wall Nanotubes: A New Option for Conductive Plastics and Engineering Polymers, Plastics Additives & Compounding (Jan./Feb. 2003).
R.E. Evans et al, Nickel Coated Graphite Fiber Composites, SAMPE Quarterly, vol. 17, No. 4, Jul. 1986.
Fielding et al, Nanocomposites for Lightning Strike Protection, U.S. Government, pp. 1-14, known as of Oct. 31, 2007.
Ginger Gardiner "Lightning Strike Protection for Composite Structures" High Performance Composites, Jul. 1, 2006.
M. Jose et al, "Synthesis and processing of aligned carbon nonotube based fibers" SAMPE Symposium, May 2003, pp. 1-5.
Franz Kreupl et al "Microelectronic Interconnects based on carbon nanotubes" Condensed Matter, Materials Science, Oct. 25, 2004.
Zhiyong Liang et al "PD262 Investigation of Thermal Conductivity of Carbon Nanotube Buckypapers and Nanocomposities", SAMPE Symposium, May 2005, pp. 1-9.
Miller and Harris, The Carbon Nanotube Patent Landscape, Nanotechnology Law & Business, Dec. 2006, pp. 427-454.
J.A. Pontecorvo, "Protection of Airplane Fuel Systems Against fuel Vapor Ignition Due to Ligntning" Federal Aviation Administration, Advisory Circular, Apr. 12, 1985, AC No. 20-53.
Edward J. Rupke "What happens when lightning strikes an airplane?", Scientific American, Aug. 14, 2008.
D. Shi et al "Magnetic Alignment of Carbon Nanofibers in Polymer Composites and Anisotropy of Mechanical Properties", J. Appl. Phys., 97 (064312): 1-5(2005).
Takesue et al, Superconductivity in Entirely End-Bonded Multiwalled Carbon Nanotubes, Feb. 10, 2006, pp. 1-4, PRL 96,057001 (2006), The American Physical Society.
Kenneth B. K. Teo et al, Catalytic synthesis of carbon nanotubes and nanofibers In: Nalwa, H.S., (ed.) Encyclopedia of Nanoscience and Nanotechnology (2003) American Scientific Publishers, Stevenson Ranch, CA, USA, pp. 665-686. ISBN 1588830012.
Nick Titchenal et al "SWNT and MWNT Reinforced Carbon Nanocomposite Fibrils", 36th International SAMPE Technical Conference, Nov. 2004, pp. 1-11.
Namiko Yamamoto et al, "Electrical and thermal properties of hybrid woven composites reinforced with aligned carbon nanotubes," in Proceedings of the 49th AIAA/ASME/ASCE/AHS/ASC Structures, Structural Dynamics, and Materials Conference, Schaumburg, Ill, USA, Apr. 2008.

* cited by examiner

ARMCHAIR (α = 30°)

ZIGZAG (α = 0°)

INTERMEDIATE (0< α = 30°)

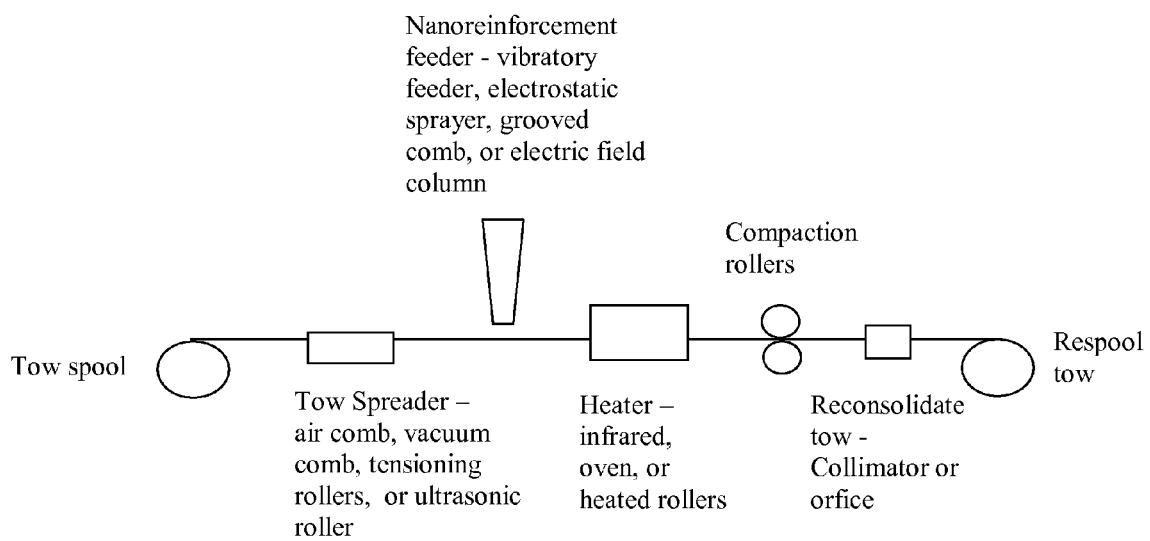
Figure 3. Nanoreinforcement coating process

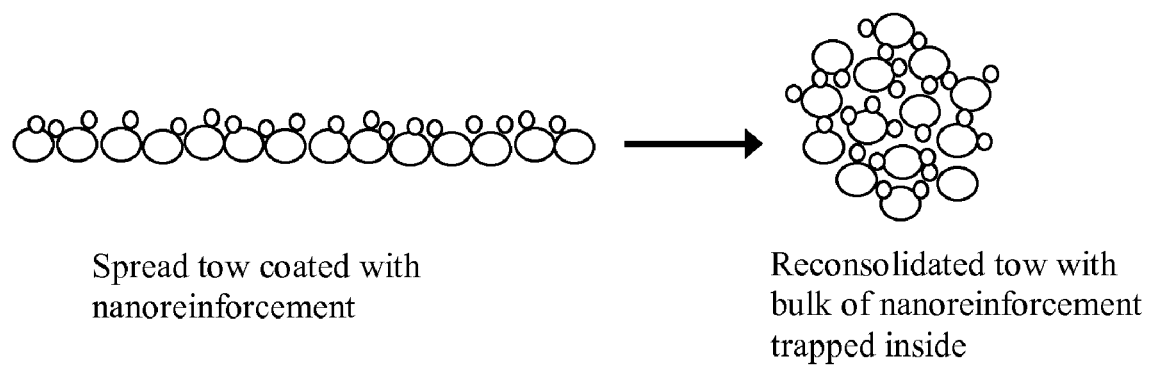
Figure 4. Nanoreinforced tow bundle (~usually 3K, 6K, or 12K filaments)

NACELLES AND NACELLE COMPONENTS CONTAINING NANOREINFORCED CARBON FIBER COMPOSITE MATERIAL

CROSS-REFERENCE TO RELATED APPLICATIONS

This is a national stage application from International Application No. PCT/US07/67934 pursuant to 35 USC 371, filed May 1, 2007, which claims the benefit of priority of U.S. Provisional Application Ser. No. 60/796,995 filed May 2, 2006, the content of which is incorporated herein by reference in its entirety.

BACKGROUND OF THE INVENTION

1. Field of the Invention

This invention is directed to nanoreinforced fibers, in general, and more particularly to methods of making nanoreinforced fiber tows or yarns for use in composite material applications.

2. Description of the Related Art

Carbon fibers are light weight materials that can exhibit high strength and high stiffness. Carbon fibers are typically produced by high-temperature pyrolysis of polyacrylonitrile (PAN), pitch, or rayon precursor. High heat treatment (above about 1000° C.) of polyacrylonitrile (PAN) based fibers results in essentially 100% carbon as well as a more oriented graphene microstructure and a significantly higher modulus. As the modulus increases, the fibers typically become more difficult to process resulting in increased costs due to heat treatment and subsequent processing (e.g., weaving). For example, at present, intermediate modulus (~270 GPa) fiber in a woven fabric is approximately twice the cost of a standard modulus (~220 GPa) fiber, but only exhibits about a 20% improvement in strength and stiffness.

In use, the carbon fibers may be processed or woven and then impregnated with resin to form a composite structure. Carbon fiber composites can exhibit a significantly higher strength to weight ratio in comparison to metals, resulting in a potential weight savings of up to about 50%. Carbon fiber composites also can have superior fatigue properties in comparison to metallic structures, and are corrosion resistant. With such advantageous structural properties, carbon fiber composites are suitable for use in various articles including aircraft and aircraft components.

Attempts have been made to overcome the processing challenges associated with carbon fiber formation while improving the carbon fiber's structural properties for use in various composite structures. These efforts include the use of carbon nanotube reinforcements to improve the strength and stiffness of various types of carbon fibers.

U.S. Pat. No. 7,153,452 references a mesophase pitch-based carbon fiber that includes carbon nanotube reinforcements in an amount ranging from about 0.01 percent to about 1.0 percent by weight. Other efforts have focused on structural improvements utilizing polyacrylonitrile (PAN)-based fibers. Such efforts include the use of an electrospinning process to align and disperse carbon nanotubes before introduction to polyacrylonitrile (PAN) precursors. The dispersion and alignment of the carbon nanotubes is believed by some to directly impact the carbon nanotubes' effectiveness as a reinforcement material. Titchenal, et al., "SWNT and MWNT Reinforced Carbon Nanocomposite Fibrils," Drexel University, Society for the Advancement of Material and Process Engineering. In addition to electrospinning, mechanical and magnetic methods exist to align the carbon nanotubes before addition to the polyacrylonitrile (PAN) precursor.

There still exists a need for more efficient methods of enhancing or improving the structural properties of carbon and polyacrylonitrile (PAN)-based fibers. There also exists a need for using such fibers in composite structures.

SUMMARY OF THE INVENTION

The present invention relates to methods of making carbon fibers, including fiber tows and yarns having enhanced strength and stiffness. The present invention is further directed to composite materials, containing the carbon fibers.

The fibers of this invention can include from about 0.1 to about 20 percent by weight of one or more nanoreinforcement materials. In an alternative embodiment, the nanoreinforcement materials can comprise from about 2 to about 8 percent of the fiber by weight.

In one embodiment of making the fibers, nanoreinforcement materials can be added to a liquid solution containing solvent, adhesive or fiber sizing or a combination thereof, then poured onto one or more fibers. In another embodiment, the nanoreinforcement materials can be powder coated and introduced into one or more fibers. The methods can further include adhering nanoreinforcement materials such as carbon nanotubes (FIG. 1) or nanofibers (FIG. 2) into a spread carbon tow or yarn (FIG. 3) to form modified fiber tows or yarns. Nanoreinforcement materials such as carbon nanotubes (~1 TPa modulus) or nanofibers may be aligned in the direction of micron-sized carbon fibers (i.e. after carbonization of polyacrylonitrile (PAN) precursors). The carbon nanotubes or nanofibers may be coated with metals or functionalized for further modification.

Carbon fiber tows or yarns including the nanoreinforcement materials can be processed (woven, unidirectional, etc.) for impregnation with a thermoset resin or thermoplastic to form various composite structures or materials.

BRIEF DESCRIPTION OF THE DRAWINGS

FIG. 3 illustrates one embodiment of the method of applying nanoreinforcement materials to the fiber as described herein.

FIG. 4 illustrates a spread tow coated with nanoreinforcement materials and the reconsolidated tow.

DETAILED DESCRIPTION OF THE INVENTION

Figure 1:
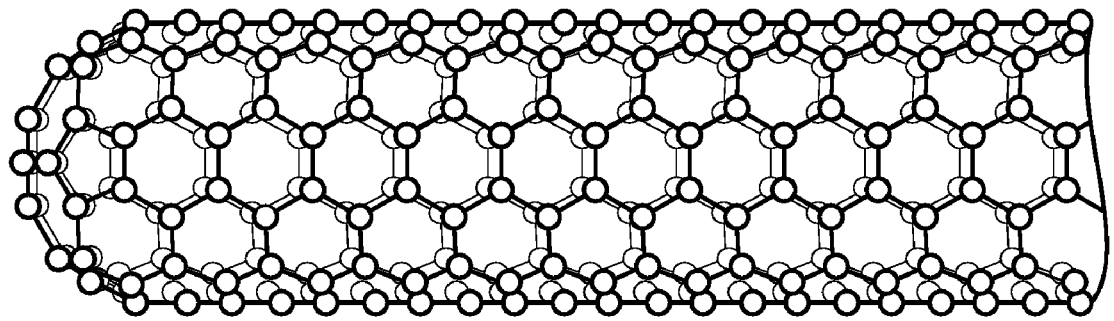
FIG. 1 illustrates various carbon single wall configurations which can be used in the nanoreinforcement coating process described herein.
Figure 1:
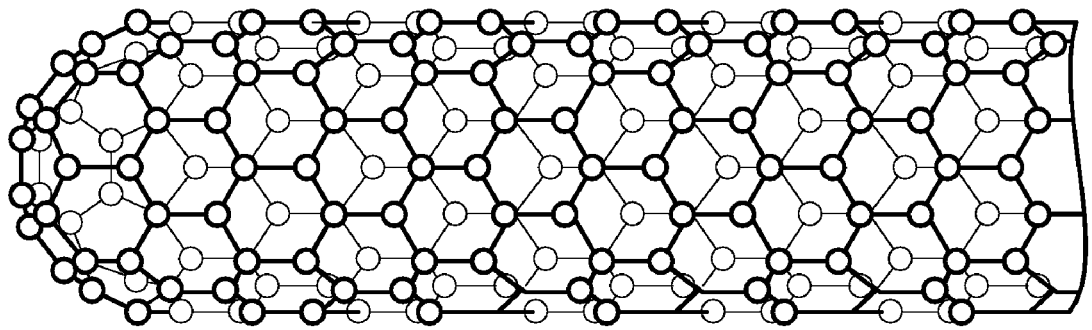
Figure 1:
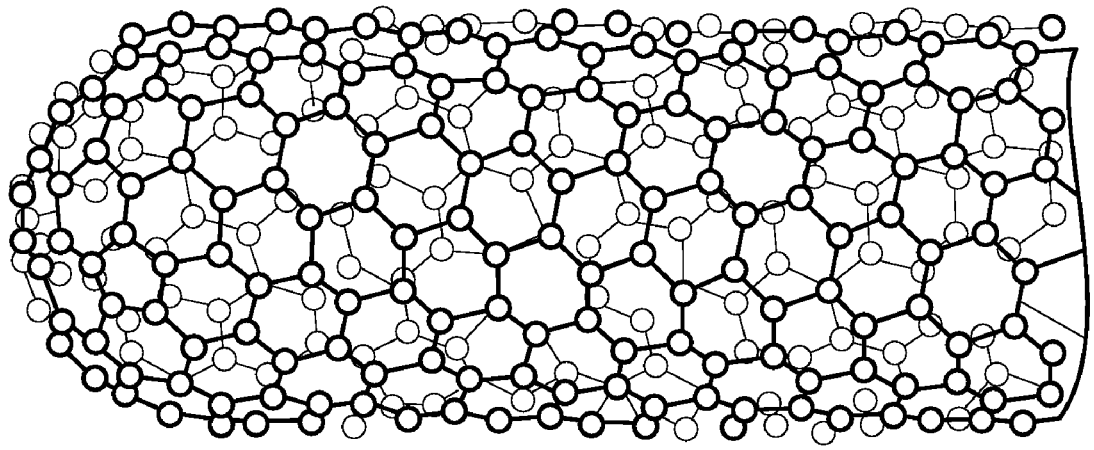
Figure 2:
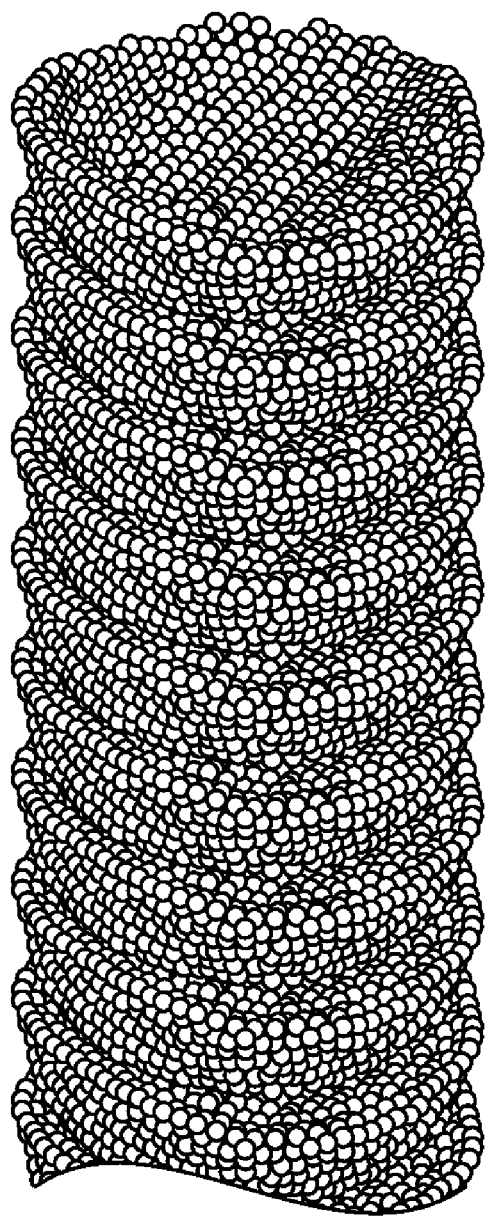
FIG. 2 illustrates a carbon nanofiber.

Methods of enhancing structural properties and multifunctionality of fibers, including fiber tows or yarns by adhering nanoreinforcements to the individual filaments of the tow or yarn, are disclosed herein. The nanoreinforcements can be added after the tow or yarn has been manufactured (i.e., not during spinning or fabrication of the fibers). The tow or yarn can be spread to expose the filaments for subsequent adherence of the nanoreinforcement.

Below is background for several of the terms used herein:

Carbon fiber as used herein is defined as fiber produced by pyrolysis of organic precursor fibers, including but not limited to those based on (polyacrylonitrile) PAN, rayon or pitch. Carbon fibers can be used primarily in composites, which are engineered structures or materials containing two or more components having differing chemical or physical properties where the resulting material has structural properties not present in the original materials. Normally, the components can be physically identified and exhibit an interface between one another. In the case of fiber reinforced composites, the components may be a fiber and a resin.

Honeycomb cores are lightweight, cellular structures typically made from either metallic sheet materials or non-metallic materials (e.g., resin-impregnated paper or woven fabric) and formed into hexagonal nested cells.

Nanoreinforcements include single wall carbon nanotubes, multi-wall carbon nanotubes, carbon nanofibers, graphite nanoplatelets, fullerenes, nanoparticles of elements, nanoparticles of binary and complex compounds, and the like.

Polyacrylonitrile (PAN) is a polymer which, when spun into fiber, can be used as a precursor material to make certain carbon fibers.

Reinforcement materials can be combined with resin matrices to form composite materials. The reinforcements are typically in the form of continuous fibers, which may be woven or non-woven. As used herein, the term "fibers" specifically includes carbon fibers, fiberglass, boron, aramid or other organic fibers. Reinforcement fabrics include woven carbon fiber, fiberglass, boron, aramid or other organic fibers used to prepare prepregs and honeycombs.

The terms "repair" and "retrofit" refer to the reinforcement or repair of existing structures. When the repair or retrofit is performed with composite materials, the result can be relatively light weight and lower in cost then other alternatives.

Sizing is a neutral finishing agent (e.g., epoxy) that protects the fibers during further processing (e.g. prepregging) and acts as an interface to the resin system of the composite.

Structures that can be made from the composite materials described herein include finished components for aircraft and industrial applications. When the structures are present in aeronautical applications, they can be used in primary or secondary external structures. In automotive applications, they can be used in chassis fairings and floors, among other applications.

A surface treatment operation can form chemical bonds to the carbon surface, and can give better cohesion to the resin system of the composite.

I. Types of Fibers That Can Be Reinforced

Various fibers, including tows and yarns may be reinforced with the nanoreinforcements described herein. The types of fiber tows or yarns capable of reinforcement include the following:

Carbon Fibers

Carbon fiber can be described as a fiber containing at least 90% carbon obtained by the controlled pyrolysis of appropriate fibers. Carbon fibers are used, for example, in commercial and civilian aircraft, recreational, industrial, and transportation markets. Carbon fibers may be present in composites that are typically used in applications requiring strength, stiffness, relatively low weight, fatigue resistance, high temperature resistance, chemical inertness or high damping properties.

A number of carbon fiber precursors can be pyrolyzed to produce carbon fibers, and, depending on the precursor used, the resulting carbon fiber will have different morphology and specific characteristics. Typical precursors include polyacrylonitrile (PAN), cellulosic fibers (viscose rayon, cotton), petroleum or coal tar pitch and certain phenolic fibers. Controlled pyrolysis can remove the oxygen, nitrogen and hydrogen from the fibers to form carbon fibers. The mechanical properties can be improved by increasing the crystallinity and orientation, and by reducing defects in the fiber.

Based on carbon fiber properties, carbon fibers can be grouped into various types, including Ultra-high-modulus (modulus >about 450 Gpa), High-modulus (modulus between about 300 and about 450 Gpa), Intermediate-modulus (modulus between about 250 and about 300 Gpa), and Low-modulus (modulus <about 250 GPa). High modulus fiber can be described as a more refined carbon fiber. The term "modulus" refers to "Young's Modulus", a measurement of stiffness, where higher numbers correlate to stiffer fiber. High modulus fibers can be typically produced by stripping off the outer layers of the individual fibers, leaving a stronger core.

Based on precursor fiber materials, carbon fibers can be classified into a number of groups. There are PAN-based carbon fibers (formed by the pyrolysis of polyacrylonitrile), pitch-based carbon fibers, mesophase pitch-based carbon fibers, isotropic pitch-based carbon fibers, rayon-based carbon fibers, and gas-phase-grown carbon fibers. High strength carbon fiber tows or yarns are usually supplied in 24K, 12K, 6K, 3K and 1K yarn or tow sizes, where K=1000 filaments (fibers).

Other Fibers

In addition to the carbon fiber tows, other fiber tows can be reinforced using the nanoreinforcements described herein. Examples include fiberglass such as E glass and S glass, and aramid fibers such as Kevlar. The fibers can be boron fiber, and can be formed of polymers, such as thermoplastic or other organic fibers.

Boron fiber can be typically produced by chemical vapor deposition. For example, boron can be deposited on a tungsten wire, glass, or graphite filament core. The resulting boron-coated filaments have nominal diameters ranging from about 0.1 to about 0.2 mm. The filaments have low density, high tensile strength as well as a high modulus of elasticity, and stiffness. Their stiffness can make the filaments difficult to weave, braid, or twist, but they can be formed into resin impregnated tapes. Such tapes can be used in hand lay-up and filament winding processes.

High modulus carbon can be co-mingled with boron fiber, which exhibits high stiffness in compression. When combined with the high tensile stiffness of the carbon, a synergistic result can be achieved where the overall stiffness is greater than that predicted by the properties of the individual fibers. The ultra tough boron fiber also can protect the more brittle high modulus carbon fiber.

Sizing

Carbon fibers can tend to be brittle, and may need some protection or lubrication as they are handled. The fibers can be "sized" using "size materials" (also known as "sizing" or, simply, "size") selected to protect the carbon fibers. Ideally, the size material is selected to provide consistent handling and to not build up any residue on the processing equipment. Further, the sizing material preferably does not increase friction between the fiber and any point that is touched during handling, and does not impede the penetration of resin into the fiber bundle.

Size materials should be compatible with the matrix resin. The phrase "compatible with" includes solubility in and reactivity with the formulated resin. The resin should be able to penetrate the fiber bundle and interact with the fiber surface. Typically, sizes that are used with epoxy resins can use an epoxy formulation as the sizing material. The size preferably should not change in chemical or physical characteristics during storage of the sized fiber to allow consistent handling after aging. Some sizes are water-soluble, and can be washed or burned off after weaving or braiding, but before the resin is applied. Others, such as polysiloxane and organosilane finishes, may be less water-soluble.

Sizes can fall into two categories. The first can be relatively low molecular weight sizes, which allow the tow bundle to be soft and easily spread, and which are typically used for prepregging. The second can be made of film forming materials, which are relatively higher molecular weight polymers that form a tough film after the fiber is dried. The film can offer more protection to the tow bundle and also prevents broken filaments from depositing on process equipment.

Some size materials, such as epoxy resins, are not water-soluble and must be applied as either an aqueous dispersion or as an emulsion. The size can be uniformly distributed on the surface of the fibers, or can exist as droplets either on the fiber surface or sticking together a number of individual fibers. Accordingly, manufacturers typically strive to control the composition, concentration, and particle size of the emulsion in the sizing bath, as well as the drying conditions, to provide a consistent product.

Unidirectional prepregs can be prepared using a hot melt process. For this type of process, the fiber preferably needs to spread easily and have consistent incoming width that will eliminate gaps and allow for thin prepregs to be made from less expensive larger tow bundles. For this process, relatively low levels of sizing (<about 1%) can provide adequate protection.

When carbon fiber is used in operations that subject it to much greater levels of abuse, such as weaving or braiding, a higher level of protection can be required, and so higher levels (>about 1%) of sizing may be used. Higher size levels may also be used to produce flat tow products, e.g., fiber bundles spread to a highly uniform width on a spool. Carbon fiber that is chopped to be used as a short fiber reinforcement in thermoplastic resins typically has a high (>about 1%) size level.

Manufacturers can use a solvent to wash or burn off sizing to determine overall size content. Because the sizing is applied at low levels versus the surface area of the fiber bundle, it can be difficult to assess the uniformity of coverage, Secondary characteristics such as friction, fiber damage and spreadability can be correlated to size level and uniformity of coverage.

II. Nanoreinforcements Used to Modify Fiber Tows and Yarns

There are many types of nanoreinforcements that can be used to modify the fiber tows or yarns described herein. Examples include carbon nanotubes and carbon nanofibers, graphene sheets, fullerenes, nanoparticles, and nanowires.

Carbon Nanotubes

From an economic perspective, the use of carbon nanofibers (multi-wall carbon nanotube) is preferred over the higher cost single wall carbon nanotubes; however the conductivity is significantly less. The carbon nanotubes can be pure or functionalized, and can be metal-coated or polysiloxane-modified. When a polysiloxane coating is applied, there can be ideally at least about 1% polysiloxane per total fiber weight.

The nanofibers can be aligned along the fiber tows or yarns, to provide the reinforced fiber tows or yarns with advantageous reinforcement properties. The nanotubes can be aligned through various methods, including mechanical, chemical, and magnetic methods. For example, the nanotubes can be mixed with the adhesive and extruded onto the fiber or tow to be coated. The feed screw can be vibrated to improve the alignment of fibers in the flow direction. This operation can be similar to vibration injection molding used with recycled thermoplastics. The nanotubes can be functionalized to react with the tail or head of each nanotube such that it will self-assemble (similar to lipid bi-layer assembly). This can involve optimizing the nanotube loading so that the nanotubes attract each other, while also ensuring that any thermosetting monomers used to adhere the nanotubes to the fibers (i.e., an epoxy resin) do not interfere with the process. Additionally, the nanotubes can be prepared such that a nickel particle is attached to one end. Ferrous alloy nanoparticles and carbon nanotubes (with the nickel particle) can be added to the adhesive, primer, or paint and subjected to a magnetic field to align the nanotubes.

Preparation of Carbon Nanotube and Metal Powder Blends

A carbon nanotube-copper composite powder can be prepared by an electrodeposition process using a copper plating bath. The bath contains homogenously dispersed carbon nanotubes. Particles of the composite with a "spiky" ball structure are accumulated on the plating electrode during the initial stage of electroplating, and can be separated to produce a carbon nanotube-copper powder. In the present invention, the nanotubes may be embedded into the copper particles.

Metal-Coated Microspheres and Carbon Nanotubes

Carbon nanotubes can be coated with metals, such as silver, using techniques known in the art. Metallic conducting 10,10 armchair configuration single wall nanotubes or metallic coated nanotubes or fibers can be used in the micron size fiber tows or yarns, for example, to improve the conductivity for EMI shielding or lightning strike protection. These modified fiber tows or yarns can also improve the thermal conductivity of the resulting composite prepared from the tows or yarns.

Typically, carbon nanotubes are pre-treated, for example, by oxidation, hydrophilic treatment, sensitizing treatment, activating treatment or a combination thereof. Such treatment may be required because carbon nanotubes typically have low chemical reactivity, and do not act as a catalyst for the deposition of metal coatings. The pre-treatment provides activated sites that permit plating of metals such as silver. Other pre-treatment steps that provide such activated sites can also be used.

Oxidation can be performed, for example, using nitric acid. Sensitization and activation can be carried out, for example, by immersing the tubes in an acidic tin chloride solution, rinsing, and then immersing the tubes in an acidic palladium chloride solution. During sensitization, activation, and electroless plating, the reaction mixtures can be agitated using ultrasound. These steps provide the surface of the nanotubes with various functional groups, such as carboxylic acid, ketone and hydroxyl groups.

Electroless plating can provide a metal coating layer roughly about 10 to about 20 nm in thickness. The metal atoms aggregate laterally and vertically to form a continuous layer. In one embodiment, silver-coated carbon nanotubes can be used to provide an electrically conductive layer.

The density of the microspheres, nanotubes or combination thereof, preferably is close to the density of the fibers that are being reinforced. For example, the density of silver-coated microspheres is about 0.13 lb/in$^3$ (3.5 g/cm$^3$) for about 70 micron average diameter with a about 5 micron silver coating. An ultrasonic horn or roller may be used to help mix and disperse the particles.

Single-Wall Carbon Nanotubes

Carbon nanotubes in a 10,10 configuration can have a resistivity close to copper and can be six times lighter than copper. These carbon nanotubes can preferably be aligned in-plane to conduct electricity. The nanotubes may be aligned through various methods. Mechanical, chemical, and magnetic methods can be used to align the nanotubes. For example, the nanotubes can be mixed with the adhesive and extruded onto the fiber tows or yarns to be coated. The feed screw can be vibrated to improve the alignment of fiber tows or yarns in the flow direction. The nanotubes can be functionalized to react with the tail or head of each nanofiber such that it will self-assemble (similar to lipid bi-layer assembly). This typically requires optimizing the nanotube loading so that the nanotubes attract each other, while also ensuring that the epoxy does not substantially interfere with the process. Finally, the nanotubes can be made such that a nickel particle is attached to one end. Ferrous alloy nanoparticles and carbon nanotubes (with the nickel particle) can be added to the adhesive, primer, or paint and subjected to a magnetic field to align the nanotubes.

Modified Carbon Nanotubes

Carbon nanotubes or other nanoparticles may be modified to decrease their resistivity. By bonding metal atoms to the end or sides of carbon nanotubes the electron pathways are increased or made more efficient, hence lowering their resistivity. These modified nanotubes can be oriented in-plane or used within a two-phase polymer.

Nanoscale Graphene Plates and Graphite Nanoplatelets

The nanoscale graphene plates (NGP's) of one or several layers of graphene planes are commonly called graphite nanoplatelets (GNPs). Graphite flakes are usually exfoliated using ultrasonic energy, and the level of exfoliation can be controlled by adjusting the sonification time.

The graphite nanoplatelets tend to be less expensive than single wall carbon nanotubes. Separation of the layers can be more desirable than full exfoliation of platelets as there can be a higher probability of contact with adjacent platelets. The platelets can be aligned in-plane via a vibration (ultrasonic or other mechanical), shear flow, or covalent bonding method. The platelets can also be coated with a polymer and aligned using an electric field.

The graphene sheets can be covalently bonded to each other on the edges using technology similar to the processes referenced in US Patent Application Publication No. 2005/0069701 for covalently bonding carbon nanotubes to each other. Functional groups can be attached to the graphite nanoplatelet edges and then cross-linked to each other. In one embodiment, the cross-linking agent should not be self polymerizable. An epoxy matrix may be cross-linked to the surface of the platelets to prevent cracking between the layers of platelets.

The graphite nanoplatelets (GNPs) can be coated in a thermoplastic for alignment. Polyvinylidene fluoride (PVDF) may be used to provide an interpenetrating mechanical bond at about 350° F. for curing epoxy prepreg. A thermoplastic layer may be used for subsequent bonding of composite structures to each other. The thermoplastic can be used to provide an interlayer between the graphite nanoplatelet (or other nanoparticle) and the epoxy surface film. The thermoplastic can also be used for alignment of graphite nanoplatelets with subsequent processing. Other thermoplastics such as polystyrene (PS), polyphenylene sulphide (PPS), polyetherimide (PEI), and polyetheretherketones (PEEK) can also be used for this purpose.

Nanowires and Nanoparticles

Metal nanorods, nanowires, or nanostrands (collectively referred to hereinafter as "nanowires") may also be used as reinforcement materials. Copper, silver, or aluminium may be preferred for their higher conductivity. The metal nanowires can be added directly to the resin. In addition to metals, other elements can be used, including silicon. Nanoparticles of binary compounds, such as silicon oxide, titanium oxide, and complex compounds, such as titanium silicon oxide, silver copper alloy, and the like, can also be used. Nanopowders in the form of spheres, may also be used. Ideally, the nanoparticles can be embedded within the fiber tow or yarn bundle to mechanically lock the tow or yarn in place.

In one embodiment, nanoparticulates such as silica can be used in place of or in addition to carbon nanofibers or nanotubes. In this embodiment, the nanoparticulate silica powder can be deposited into the tow and adhered with the epoxy sizing on the tow or thermoplastic coating. This can allow for significantly improved fire resistance. During a fire of an aircraft engine nacelle component, the polymer matrix would burn off during the initial stages of the fire, leaving the carbon fibers to remain. When nanoparticulate silica is attached to the carbon fibers, it will turn into glass at the temperatures encountered during a fire, thus increasing the burn-through time. Ultimately, this resistance to burning allows for less number of plies to achieve a certain burn-through time. In an alternative embodiment, carbon nanotubes or nanoparticles can be sized with a polysiloxane, to perform the same function. The polysiloxane can be present at approximately 1% by weight of the standard carbon fiber.

Fullerenes

Fullerenes are within a family of carbon allotropes. Fullerenes can be described as molecules comprised entirely of carbon, in the form of a hollow sphere, ellipsoid, or tube. Spherical fullerenes are sometimes called "buckyballs," and cylindrical fullerenes are called "buckytubes." Fullerenes are similar in structure to graphite, which is composed of a sheet of linked hexagonal rings, but they contain pentagonal (or sometimes heptagonal) rings that prevent the sheet from being planar.

When used as nanoreinforcing materials, fullerenes can be pure or functionalized as is understood in the art, and can be metal-coated, for example, using the metals described above with respect to the carbon nanotubes.

III. Methods for Applying the Nanoreinforcements to Fiber Tows or Yarns

The nanoreinforcement materials recited herein may be applied to fiber tows or yarns. In one embodiment, the nanoreinforcement materials are coated with a thermoplastic powder, and then are electrostatically sprayed onto the fiber tows or yarns. In another embodiment, the nanoreinforcement materials are mixed into a liquid, for example, a solution that includes a solvent including adhesive, sizing, or a combination thereof, which is then sprayed onto the fiber tows or yarns. In either embodiment, the nanoreinforcement materials may be introduced to micron size carbon fibers derived from (polyacrylonitrile) PAN precursors (i.e. after carbonization of (polyacrylonitrile) PAN).

The nanoreinforcement materials can be applied in a random orientation, or an ordered orientation. When they are to be applied in an ordered manner, this can be accomplished using a variety of means, including electric field orientation, a moving tow, a special (i.e., spinning, vibration, etc.) nozzle or combing with grooved feeder or platen. Such application techniques are either as described herein or as known in the art, and can be applied singularly or in combination with other techniques.

The application of nanoreinforcement materials onto spread fiber tows or yarns can form modified fibers, tows or yarns, where the nanoreinforcement is adhered to or trapped within the tow yarn. FIG. 4 illustrates a nanoreinforced tow wherein the nanoreinforcement material is adhered or trapped within the carbon tow. In one embodiment, aligning the nanoreinforcement materials (such as carbon nanotubes or nanofibers) in the direction of micron-sized carbon fibers in the tows or yarns improves the carbon fiber tows or yarns strength or stiffness or a combination thereof. When the reinforcement material is in the form of carbon nanotubes or nanofibers, these can optionally be coated with metals, or functionalized for further modification. While not wishing to be bound to a particular theory, it is believed that the improvement in structural properties such as tensile strength through the use of nanoreinforcement materials such as nanotubes and nanofibers is dependent, at least in part, on the gaps and overlaps between the ends of the nanofibers or nanotubes.

Powder Coating

In one embodiment of the methods described herein, nanoreinforcement materials may be applied to carbon nanotubes or carbon nanofibers. The carbon nanotubes or nanofibers can be aligned for deposition into the tows or yarns using mechanical (e.g., vibration plated) or electrical means before powder coating. Alternatively, one can powder coat the nanotube or nanofiber with thermoplastic, then align the nanotubes or nanofibers.

The powder coated nanotubes or nanofibers can then be spread onto micron size carbon fiber tows or yarns. The tows or yarns can then be heated, pressed, or a combination thereof to ensure the carbon nanotubes or nanofibers adhere to the tow or yarn for subsequent processing. In an alternative embodiment, the powder coated carbon nanotubes or nanofibers may be electrostaticly sprayed into a spread tow or yarn. A moving tow or yarn may be used with a special (e.g., spinning, vibration, etc.) nozzle that may be used to help control orientation during spraying.

Liquid Application

The nanoreinforcement can also be applied using a liquid media. In one embodiment, the materials are added to a liquid solution and sprayed or poured onto the fiber tows or yarns. The solution includes solvent and can optionally also include sizing and adhesive. The liquids may be applied to a moving tow or yarn. Optionally, the nanoreinforcement liquid may be applied using a special (e.g., spinning or vibrating) nozzle, a grooved feeder, a platen or a combination thereof.

When a liquid solution containing the nanoreinforcement materials, solvent, adhesive, and fiber sizing is poured onto the spread tow or yarn, the dispensing head or the tow or yarn can be vibrated or moved to help orient the nanotubes or nanofibers. The feeder can contain grooves that simulate a comb. After the spread tow or yarn is coated, the feeder can be pulled through platens with the grooves placed on the platens. Combing orients the nanotubes or nanofibers. In one embodiment, the nanotube or nanofiber sizing is the same epoxy-compatible sizing used on the micron sized carbon fibers. This embodiment permits the nanoreinforcement materials, such as nanotubes or nanofibers, to adhere to the micron sized carbon fiber in the tows or yarns with the application of heat, pressure or a combination thereof. The nanoreinforcement materials may be coated with or contain ferromagnetic metals, which can enable the materials to be aligned in a subsequent magnetic field.

In another embodiment, the carbon nanotubes or nanofibers can be coated with ferromagnetic metals such as nickel or cobalt, or the nickel catalyst can be left in the grown nanotube and aligned in a subsequent magnetic field in a polystyrene solution. Magnetic alignment methods typically require very strong magnets. Accordingly, this approach may be less desirable than mechanical or electric field alignment.

One example of the nanoreinforcement process is shown in FIG. 3. In this process, a tow or yarn spool is unrolled into a tow or yarn spread, which can include an air comb, a vacuum comb, tensioning rollers, or an ultrasonic roller. A nanoreinforcement feeder is placed above the tow spreader to feed the nanoreinforcement materials onto the spread tow. The feeder can be or include, for example, a vibratory feeder, an electrostatic sprayer, a grooved comb, or an electric field column. Following application of the nanoreinforcement materials to the spread tow, the coated fiber tows or yarns pass through a heater, which can be an infrared heater, an oven, or heated rollers. The coated, heated fibers then can pass through a set of compaction rollers, and are reconsolidated into a tow using a collimator or an orifice. The reconsolidated tow can then be respooled.

IV. Preparation of Composite Materials

The resulting nanoreinforced fiber tows or yarns can be molded into high strength composite materials for structural applications. For example, the nanoreinforced fiber tows or yarns can be processed into composite materials using either thermoset or thermoplastic polymers, via conventional methods (e.g., prepreg lay-up, towpreg, filament winding, resin transfer molding, fiber placement, and the like).

In one embodiment, fiber tows or yarns including the reinforced fibers described herein can be processed (e.g., woven, unidirectional, etc.) for impregnation with a thermoset resin or thermoplastic to form a composite structure. The resin-applied modified fiber tows or yarns (prepreg or towpreg) can then be shaped into a composite structure before curing. The fiber tows or yarns can also be used in a woven or nonwoven dry form for resin transfer molding or resin film infusion of the composite structure. In another aspect, the thermoplastic-impregnated fibers are shaped and the thermoplastic is consolidated.

The performance increase of the modified fiber tows or yarns relative to the unmodified fiber tows or yarns can be greater than the weight increase caused by the modification. In this embodiment, the amount of carbon nanotubes or nanofibers is generally between about 0.1 and about 20% by weight, but can be between about 2 and about 8% by weight, of the carbon fiber tows or yarns. Increased fiber stiffness and strength can result in a significant weight saving, which can be particularly important in applications, e.g., airborne structures, where low weight and high strength are desired. The cost savings of adding a low percentage of carbon nanotubes or nanofibers to the tow bundle may be lower than switching to a higher performance micron size carbon fiber tow or yarn.

V. Articles of Manufacture Including the Composite Materials

The nanoreinforced fiber tows or yarns can be used to prepare virtually any composite materials commonly made using the fiber tows or yarns themselves. Examples include products in the aerospace and nuclear engineering fields, the general engineering and transportation fields, engineering components, such as bearings, gears, cams, fan blades and automobile bodies, components in the building and construction industries, and in decorative elements in automotive, marine, general aviation interiors, general entertainment and musical instruments and after-market transportation products. The fiber tows or yarns can also be used to provide conductivity in electronics technology.

There are many applications that can take advantage of carbon fiber's physical strength, specific toughness, and light weight. These include products in the aerospace, road and marine transport, and sporting goods industries (for example, golf clubs, bicycle frames and components). Specific examples also include nacelles (and components thereof) for use to house and operate with aircraft engines.

Examples of nacelle components include monolithic carbon fiber thrust reverser cascades, nacelle cowling (such as inlet, fan, side, upper, lower, core, or nose cowls), acoustic panels, nacelle duct systems including engine build up (EBU) components, starter, cowl anti-ice, oil cooler and vent ducts, nacelle mounting and attach rings, thrust reversing systems such as fan reversers, flight control panels, airframe structures, fans, actuation accessories (pneumatic, electric, and hydraulic), exhaust nozzles, centerbodies, nose lipskins, nozzles surround the engine, fuel systems, lubrication systems, air-conditioning systems and fire warning systems.

There are applications which can take advantage of carbon fiber's high dimensional stability, low coefficient of thermal expansion, and low abrasion. These include aircraft brakes, aerospace antenna and support structure, large telescopes, optical benches, and waveguides for stable high-frequency (Ghz) precision measurement frames.

There are applications which can take advantage of carbon fiber's electrical conductivity, including automobile hoods, tooling, casings and bases for electronic equipments, EMI and RF shielding, and brushes.

There are applications which cam take advantage of carbon fiber's biological inertness and x-ray permeability, including medical applications (such as prostheses, surgery and x-ray equipment, medical implants, and tendon/ligament repair).

There are applications which can take advantage of carbon fiber's fatigue resistance, self-lubrication, and high damping. These include textile machinery and general engineering applications.

Additional applications can take advantage of carbon fiber's chemical inertness and high corrosion resistance. These include uses throughout the chemical industry and nuclear field, in valves, seals, pump components and the like.

Other applications can take advantage of carbon fiber's electromagnetic properties. These include generator retaining rings, and radiological equipment.

Non-polymer materials can also be used as the matrix for carbon fibres.

The composites can, in some embodiments, be used for the filtration of high-temperature gases, as electrodes with high surface areas and extreme corrosion resistance, and as antistatic materials in high-performance clothing.

The composites can be used in a variety of repair and retrofit applications, for example, in the aerospace industry.

Lightning Strike Protection

The nanoreinforced fibers, including tows and yarns described herein, can be used to form lightning strike protection composite materials. As used herein, a lightning strike protection material provides lightning strike protection to various structures, including those employed in the aircraft and aerospace industry. Various airworthiness certification authorities set forth or practice standards to which aircraft manufactures must comply. Based on the probability of a lightning strike and the probable intensity of the lightning current generated in the strike, various authorities designate different potential strike zones for each aircraft and the probable current waveforms to which structures and systems in these zones must be resistant. These are generally identified as Zones 1A and 1B, Zones 2A and 2B and Zone 3, as is known in the aircraft industry.

The location of strike zones on any aircraft is dependent on the geometry of the aircraft and operational factors, and often varies from one aircraft to another. Airworthiness authorities designate standards with which the aircraft manufacturers must comply. Different potential strike zones are assigned for each aircraft component and the current wave component is designated. The structure must be resistant to this strike without penetration through the thickness of the component.

Aircraft components are subjected to thermal cycling during ground to air to ground service. This thermal cycling may cause microcracking within the surface film. This microcracking may extend into the composite structure causing premature failure from exposure to moisture and/or other chemicals. Hence it is desirable to formulate the surface film such that it does not microcrack for at least 2000 cycles when exposed to thermal cycling from about −65° F. to about 160° F.

According to one aspect of the invention, composite materials include an outer layer of a lightning strike protection layer prepared using the nanoreinforced carbon fibers of this invention. Such reinforced composite materials can form a part of an exterior portion of an aircraft or aircraft components. In one aspect of the invention, the composite materials are prepared from carbon fiber tows or yarns which are reinforced using metal nanoparticles, nanowires, and the like, or metal-coated carbon nanotubes or nanofibers, and a carrier.

According to one embodiment of the invention, the carrier may include a thermoset or thermoplastic polymer. In another aspect, the carrier can be a monomer that forms a thermoset polymer. One example of a suitable polymer is an epoxy resin that, when cured, can form a thermoset polymer on the surface of the composite material, aircraft or aircraft part to which it is applied. In use, the material can be applied as the top layer of a composite material used to form structural elements of an airplane, which may optionally include an overcoat of primer or paint or a combination thereof. In this aspect, the nanoreinforcements can be ideally sized to provide adequate electrical properties (i.e., resistance) for use as a lightning strike protection material.

The concentration of nanoreinforcements may be sufficient such that the surface resistivity of the airplane to which the material is applied may be low enough to dissipate the energy from a strike without damage to the underlying plies (i.e., the plies in the composite material underlying the lightning strike protection layer). The composite material can optionally include an isolation ply, particularly where the resistivity of the material is not sufficiently low to provide adequate protection without the use of such an isolation ply. For most aspects, multiple layers can be used to achieve a desired lightning protection effect. For example, the composite material can include one or more layers of the nanoreinforced fiber tows or yarns, optionally with one or more fiberglass isolation plies.

In one aspect, carbon nanotubes in the 10,10 armchair configuration can be used as all or part of the nanoreinforcement in the reinforced tows or yarns. These carbon nanotubes can have a resistivity close to copper and can be six times lighter than copper. The nanotubes may be aligned on the yarn or fiber through various methods, including mechanical, chemical, and magnetic methods, as discussed above.

In another aspect, graphene platelets or metal nanorods, nanowires, or nanostrands (collectively called nanowires) can be used as all or part of the nanoreinforcement of the fiber tows or yarns. In a further aspect, carbon nanotubes or other nanoparticles that have been modified to decrease their resistivity can be used as nanoreinforcement materials for the fiber tows or yarns.

In a preferred embodiment, the composite materials prepared using the nanoreinforced tows or yarns can provide sufficient lightning strike protection to pass at least a Zone 2A lightning strike test, and, more preferably, can pass a Zone 1A lightning strike test. Also, the materials ideally will have desirable thermal cycling properties for use in aircraft manufacture and use. For example, it is preferred that the composite material does not microcrack for at least 2,000 cycles when exposed to thermal cycling from about −65° F. to about 160° F.

The present invention can be better understood with reference to the following non-limiting examples.

Example 1

Carbon fiber is reinforced with about 5 to about 20% by weight carbon single wall nanotube with metallic conductivity (10,10 armchair configuration). This fiber is then woven into a fabric for use as the top layer of a composite structure for lightning strike protection for aircraft structures. This layer also provides increased strength, stiffness, and thermal conductivity in the composite structure.

Example 2

Carbon fiber is reinforced with about 2 to about 8% by weight carbon nanofibers. The carbon nanofibers are coated with a silane or an organosilane finish or contain a polysiloxane. The fibers are then woven into a fabric or uniweave or prepregged as a tape to provide a composite structure with increased strength, stiffness, and fire resistance for aircraft structures.

Example 3

Carbon fiber can be reinforced with about 5 to about 20% by weight carbon single wall nanotubes with metallic conductivity or about 10 to about 60% by weight metallic nanowires or nanopowders. These fibers are woven into a fabric to use for wet lay-up repair of aircraft structures. This layer can be used on the top surface to provide repair of the lightning strike material without using an additional layer of wire screen for aircraft structures.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A nacelle or nacelle component for use in aircraft engines and comprising a composite material including carbon fibers, wherein the carbon fibers comprise from 0.1 to 20 percent by weight nanoreinforcement material.

2. A nacelle or nacelle component according to claim 1 wherein the carbon fibers comprise from 2 to 8 percent by weight of the nanoreinforcement material.

3. A nacelle or nacelle component according to claim 1 wherein the nanoreinforcement material is selected from the group consisting of carbon nanotubes, carbon nanofibers, graphene sheets, nanowires, nanoparticles of elements, nanoparticles of binary compounds, nanoparticles of complex compounds and combinations thereof.

4. A nacelle or nacelle component according to claim 1 wherein at least a portion of the nanoreinforcement material is sized.

5. A nacelle or nacelle component according to claim 1 wherein at least a portion of the nanoreinforcement material is metallic coated.

6. A nacelle or nacelle component according to claim 1 wherein at least a portion of the nanoreinforcement material is thermoplastic coated.

7. A nacelle or nacelle component according to claim 1 wherein the nanoreinforcement material comprises carbon nanotubes.

8. A nacelle or nacelle component according to claim 1 wherein the composite material further includes other fibers comprising glass fibers, aramid fibers, or polymer fibers.

9. A nacelle or nacelle component according to claim 8 wherein the carbon fibers and the other fibers are bundled to form a tow or a yarn.

10. A nacelle or nacelle component according to claim 9 wherein the carbon fibers, the other fibers, or both the carbon fibers and the other fibers are sized.

11. A nacelle or nacelle component according to claim 9 wherein the nanoreinforcement material is aligned within the tow or the yarn.

* * * * *